United States Patent
Dynes et al.

(10) Patent No.: US 10,479,360 B1
(45) Date of Patent: Nov. 19, 2019

(54) SYSTEMS AND METHODS FOR IDLE COASTING MANAGEMENT OF A VEHICLE HAVING PREDICTIVE CRUISE CONTROL

(71) Applicant: Cummins Inc., Columbus, IN (US)

(72) Inventors: Joseph R. Dynes, Columbus, IN (US); Daniel Reed Dempsey, Columbus, IN (US); Kenneth M. Follen, Greenwood, IN (US); Howard Robert Frost, Columbus, IN (US); Oruganti Prashanth Sharma, Columbus, IN (US); Ian Fredrick Lowry, Bloomington, IN (US); Nathanael G. Long, Avon, IN (US)

(73) Assignee: Cummins Inc., Columbia, IN (US)

( * ) Notice: Subject to any disclaimer, the term of this patent is extended or adjusted under 35 U.S.C. 154(b) by 0 days.

(21) Appl. No.: 16/519,636

(22) Filed: Jul. 23, 2019

Related U.S. Application Data

(62) Division of application No. 15/342,948, filed on Nov. 3, 2016, now Pat. No. 10,399,569.

(60) Provisional application No. 62/250,245, filed on Nov. 3, 2015.

(51) Int. Cl.
*B60W 10/02* (2006.01)
*B60W 30/18* (2012.01)
*B60W 30/14* (2006.01)

(52) U.S. Cl.
CPC ...... *B60W 30/18072* (2013.01); *B60W 10/02* (2013.01); *B60W 30/143* (2013.01); *B60W 2030/1809* (2013.01); *B60W 2550/143* (2013.01); *B60W 2550/402* (2013.01); *B60W 2710/021* (2013.01); *B60W 2720/103* (2013.01); *Y02T 10/76* (2013.01)

(58) Field of Classification Search
CPC .......... B60W 30/18072; B60W 10/02; B60W 30/143; B60W 2030/1809; B60W 2550/402; B60W 2710/021; B60W 2550/143; B60W 2720/103
See application file for complete search history.

(56) References Cited

U.S. PATENT DOCUMENTS

| | | |
|---|---|---|
| 4,476,745 A | 10/1984 | Moan |
| 5,345,841 A | 9/1994 | Tweed et al. |
| 6,939,268 B2 | 9/2005 | DeVore et al. |
| 8,187,149 B2 | 5/2012 | Koenig |
| 8,343,010 B2 | 1/2013 | Dreier |
| 8,494,737 B2 | 7/2013 | Maier et al. |
| 8,498,795 B2 | 7/2013 | Eriksson et al. |
| 8,626,424 B2 | 1/2014 | Schwalm et al. |
| 8,744,718 B2 | 6/2014 | Johansson et al. |
| 8,972,138 B2 | 3/2015 | Johnsnsson et al. |
| 9,393,963 B2 * | 7/2016 | Slaton ................. B60W 30/143 |
| 2006/0293822 A1 | 12/2006 | Lattemann et al. |
| 2012/0158225 A1 | 6/2012 | Books et al. |

(Continued)

FOREIGN PATENT DOCUMENTS

| | | |
|---|---|---|
| AU | 2011272219 B | 1/2012 |
| DE | 102012222348 A | 6/2014 |

(Continued)

*Primary Examiner* — David J Hlavka
(74) *Attorney, Agent, or Firm* — Taft Stettinius & Hollister LLP

(57) ABSTRACT

A system, method, and apparatus includes management of coasting during operation of a vehicle equipped with a predictive cruise control system.

10 Claims, 3 Drawing Sheets

(56) References Cited

U.S. PATENT DOCUMENTS

| | | | |
|---|---|---|---|
| 2012/0220422 A1* | 8/2012 | Wurthner | B60W 10/02 477/79 |
| 2012/0220424 A1* | 8/2012 | Staudinger | B60W 30/16 477/80 |
| 2013/0116899 A1 | 5/2013 | Iwao et al. | |
| 2013/0158838 A1 | 6/2013 | Yorke et al. | |
| 2014/0088847 A1* | 3/2014 | Abdul-Rasool | B60W 10/02 701/67 |
| 2014/0114553 A1* | 4/2014 | Abdul-Rasool | B60W 10/02 701/110 |
| 2014/0200788 A1 | 7/2014 | Eriksson et al. | |
| 2016/0304080 A1* | 10/2016 | Sugiyama | B60W 20/12 |
| 2018/0072322 A1* | 3/2018 | Ishiguro | B60W 30/143 |
| 2018/0111615 A1* | 4/2018 | Yamakado | B60W 40/068 |
| 2018/0141549 A1* | 5/2018 | Kelly | B60K 31/02 |

FOREIGN PATENT DOCUMENTS

| | | |
|---|---|---|
| EP | 0896518 B | 8/2000 |
| WO | 2014003654 A | 1/2014 |

\* cited by examiner

SYSTEMS AND METHODS FOR IDLE COASTING MANAGEMENT OF A VEHICLE HAVING PREDICTIVE CRUISE CONTROL

CROSS-REFERENCE TO RELATED APPLICATION

The present application is a divisional of U.S. patent application Ser. No. 15/342,948 filed Nov. 3, 2016 which claims the benefit of the filing date of U.S. Provisional App. Ser. No. 62/250,245 filed on Nov. 3, 2015, which are incorporated herein by reference.

BACKGROUND

The present application relates generally to management of coasting operation of a vehicle for fuel economy improvements, and more particularly to idle coasting management of a vehicle that includes a predictive cruise control system.

Vehicle manufacturers can provide vehicles with predictive cruise control systems that are designed to improve fuel economy of the vehicle during certain operating conditions. These predictive cruise control systems can be specifically configured to account for certain vehicle operating conditions in which vehicle speed is controlled to improve fuel economy, but fail to account for other operating conditions in which idle coasting of the vehicle can be beneficial for fuel economy or other operational aspects and/or components of the vehicle. Therefore, there remains a significant need for the apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

A system, method, and apparatus includes an idle coasting management (ICM) system for a vehicle that is configured to engage or disengage an engine from a vehicle driveline in response to an OEM predictive cruise control (PCC) system being active and an arbitration of a final vehicle speed request from each of the predictive cruise control system and the idle coast management system. In certain operating conditions, the ICM operations are disabled in response to the OEM PCC system being active. In other operating conditions, ICM operations are adjusted or changed from a nominal operation that would occur without a PCC system being present in response to an OEM PCC system output.

In one embodiment, the PCC system is provided with a PCC control unit or PCC control module by the vehicle manufacturer and the PCC system is independent of the ICM system. The ICM system can be provided as part of a cycle efficiency management (CEM) control unit or module, or as a separate ICM control module in the CEM control unit. The CEM control unit and/or ICM control module can also be provided as part of the engine control unit (ECU) of the engine manufacturer for the engine that operates the vehicle. The OEM PCC controller can be connected to the ICM control module via a wired connection, a datalink, a satellite connection, a wireless connection, a short range wireless proximity connection such as BLUETOOTH or near-field communication (NFC) connection, or other suitable connection for data transfer between the ICM control module and the OEM PCC control unit/module.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DETAILED DESCRIPTION OF ILLUSTRATIVE EMBODIMENTS

Figure 1:
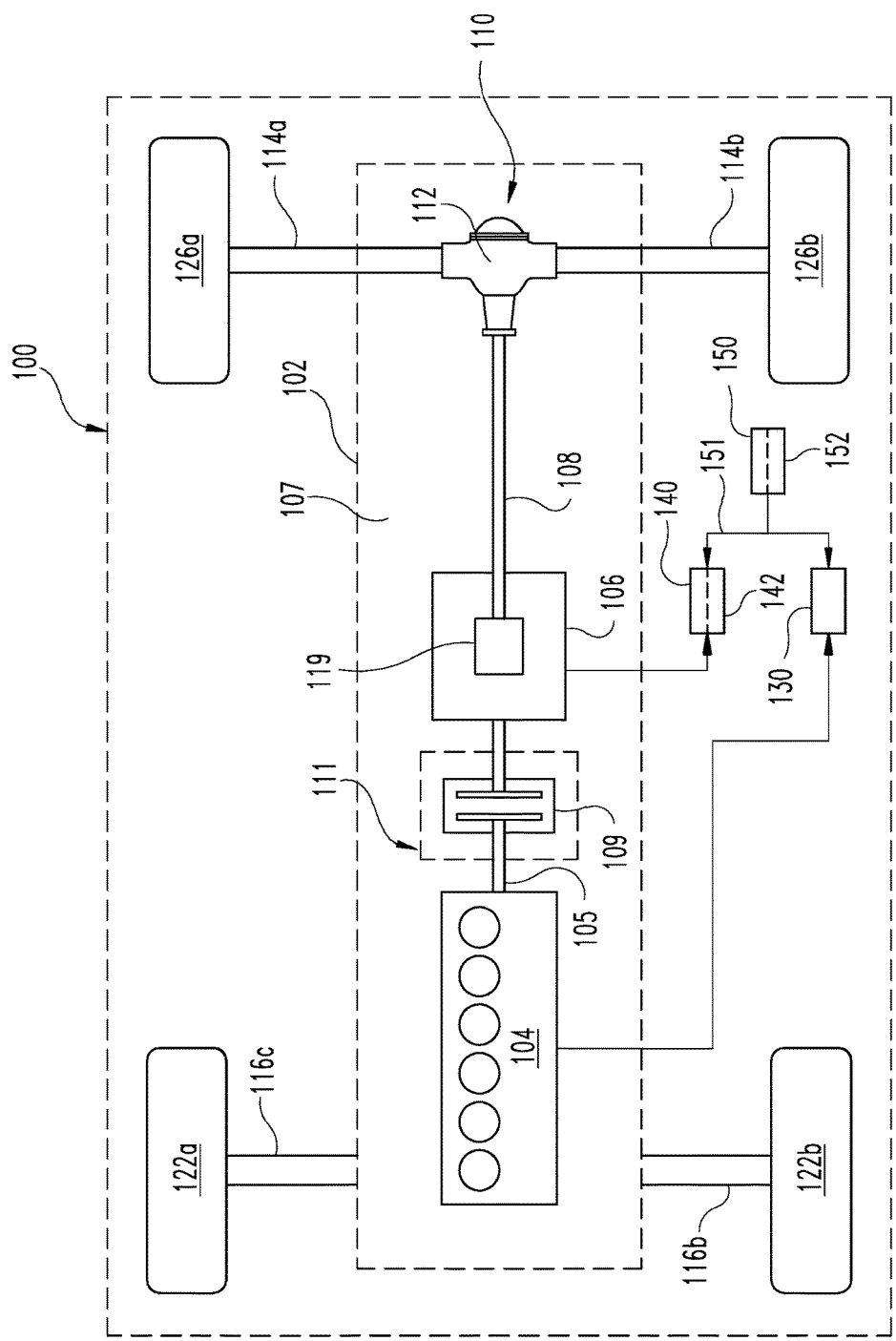
FIG. 1 is a schematic illustration of a vehicle with a predictive cruise control system and an idle coasting management system for speed control and coasting management of the vehicle.

With reference to FIG. 1, there is illustrated a schematic view of an exemplary vehicle 100 including a powertrain 102 incorporated within vehicle 100. In the illustrated embodiment, the powertrain 102 includes an engine 104, such as an internal combustion engine, structured to generate power for the vehicle 100. The powertrain 102 further includes a transmission 106 connected to the engine 104 for adapting the output torque of the engine 104 and transmitting the output torque to a driveline 107 including drive shaft 108. In the illustrated embodiment, the transmission 106 is a manual transmission that may be disengageably connected to an engine crankshaft 105 via a clutch 109. Other embodiments contemplate a transmission 106 that is an automatic transmission, an automated manual transmission, or any other suitable transmission with a disconnect device 111 that is operable to selectively engage and disengage engine 104 from driveline 107.

In the rear wheel drive configuration illustrated for vehicle 100, the driveline 107 of powertrain 102 includes a final drive 110 having a rear differential 112 connecting the drive shaft 108 to rear axles 114a, 114b. It is contemplated that the components of powertrain 102 may be positioned in different locations throughout the vehicle 100. In one non-limiting example of a vehicle 100 having a front wheel drive configuration, transmission 106 may be a trans axle and final drive 110 may reside at the front of the vehicle 100, connecting front axles 116a and 116b to the engine 104 via the transaxle. It is also contemplated that in some embodiments the vehicle 100 is in an all-wheel drive configuration.

In the illustrated embodiment, vehicle 100 includes two front wheels 122a, 122b mounted to front axles 116a, 116b, respectively. Vehicle system 100 further includes two rear wheels 126a, 126b mounted to rear axles 114a, 114b, respectively. It is contemplated that vehicle 100 may have more or fewer wheels than illustrated in FIG. 1. Vehicle 100 may also include various components not shown, such a fuel system including a fuel tank, a front differential, a braking system, a suspension, an engine intake system and an exhaust system, which may include an exhaust aftertreatment system, just to name a few examples.

Vehicle 100 includes an electronic or engine control unit (ECU) 130, sometimes referred to as an electronic or engine control module (ECM), or the like, which is directed to regulating and controlling the operation of engine 104. A transmission control unit (TCU) 140 is illustrated in vehicle 100, which is directed to the regulation and control of transmission 106 operation. ECU 130 and TCU 140 are each in electrical communication with a plurality of vehicle sensors (not shown) in vehicle 100 for receiving and transmitting operating conditions of vehicle 100, such as temperature conditions, pressure conditions, speed conditions, fuel conditions, flow conditions to and from the engine, terrain conditions, weather conditions, global positioning system (GPS) data, and vehicle mass, for example. It is contemplated that ECU 130 and TCU 140 may be integrated within the engine 104 and transmission 106, respectively.

In certain embodiments, the TCU 140 may be combined into a single control module with a predictive cruise control (PCC) module 142. The PCC module 142 and/or TCU 140 may be commonly referred to as a powertrain control module (PCM) or powertrain control unit (PCU), or the like. Other various electronic control units for vehicle subsystems are typically present in vehicle system 100, such as a braking system electronic control unit and a cruise control electronic control unit, for example, but such other various electronic control units are not show in vehicle 100 to preserve clarity.

Vehicle system 100 further includes a cycle efficiency management (CEM) controller or control unit 150, which may be directed to the control of the operations described herein and/or directed toward an intermediary control for the regulation and control of the powertrain 102 in vehicle system 100. In the illustrated embodiment, CEM control unit 150 is in electrical communication with each of the ECU 130 and TCU 140/PCC module 142. In certain embodiments, at least a portion of the CEM control unit 150 may be integrated within the ECU 130. In still other embodiments, at least the PCC module 142 communicates with ECU 130 and/or CEM control unit 150 over a datalink 151 provided by a wired or wireless connection so that outputs of PCC module 142 that are determined independently of CEM control unit 150 and/or ECU 130 can be provided to CEM control unit 150 and/or ECU 130.

CEM control unit 150 may further be in electrical communication with one or more of the plurality of vehicle sensors in vehicle 100 for receiving and transmitting conditions of vehicle 100, such as temperature and pressure conditions, route conditions, terrain conditions, speed conditions, and weather conditions, for example. It is contemplated that at least a portion of the conditions and/or measured inputs used for interpreting signals by the CEM control unit 150 may be received from ECU 130 and/or TCU 140 and/or PCC module 142, in addition to or alternatively to the plurality of vehicle sensors. Furthermore, the CEM control unit 150 may include a processor or controller and/or could be a control module. In the illustrated embodiment, CEM control unit 150 includes an intelligent coasting management (ICM) control module 152.

The CEM control unit 150 and/or ECU 130 and TCU 140 includes stored data values, constants, and functions, as well as operating instructions stored on, for example, a computer readable medium. Any of the operations of exemplary procedures described herein may be performed at least partially by the CEM control unit 150. In certain embodiments, the CEM control unit 150 includes one or more modules structured to functionally execute the operations of the controller. The description herein including modules emphasizes the structural independence of the aspects of the CEM control unit 150, and illustrates one grouping of operations and responsibilities of the CEM control unit 150. Other groupings that execute similar overall operations are understood within the scope of the present application. Modules may be implemented in hardware and/or instructions on computer readable medium, and modules may be distributed across various hardware or computer readable medium components. More specific descriptions of certain embodiments of controller operations are discussed below. Operations illustrated are understood to be exemplary only, and operations may be combined or divided, and added or removed, as well as re-ordered in whole or part, unless stated explicitly to the contrary herein.

Certain operations described herein include operations to interpret or determine one or more parameters. Interpreting or determining, as utilized herein, includes receiving values by any method known in the art, including at least receiving values from a datalink or network communication, receiving an electronic signal (e.g., a voltage, frequency, current, or pulse-width modulation (PWM) signal) indicative of the value, receiving a software parameter indicative of the value, reading the value from a memory location on a computer readable medium, receiving the value as a run-time parameter by any means known in the art, and/or by receiving a value by which the interpreted or determined parameter can be calculated, and/or by referencing a default value that is interpreted or determined to be the parameter value.

One exemplary embodiment of PCC module 142 is configured to dynamically adjust the vehicle speed profile while the vehicle is in a cruise control mode of operation using predictive cruise control. For example, PCC module 142 can use upcoming terrain data to optimize the vehicle speed profile to improve fuel economy. Any predictive cruise control operating methodology is contemplated herein. The CEM control unit 150 includes a cruise control governor that interfaces with PCC module 142 and dynamically modifies the cruise control reference speed in response to inputs from the PCC module 142. In one embodiment, CEM control unit 150 interfaces with PCC module 142 with standard SAE communication protocols.

One exemplary embodiment of CEM control unit 150 receives a PCC state and a PCC offset from PCC module 142, and CEM control unit 150 provides a PCC offset status, a cruise control (CC) speed, and a CC set speed to PCC module 142. The CC set speed is the operator selected set speed, and the CC speed is the speed currently being used as the vehicle speed target by the cruise control governor. The PCC offset status is an indication from the CEM control unit 150 of whether or not the requested PCC offset is currently included in the CC speed, and the PCC state is a value from the PCC device indicating the current state of the PCC device. Finally, the PCC offset is the requested vehicle speed offset provided by the PCC module which is to be applied to the CC set speed.

In a further embodiment, the CEM control unit 150 is configured to provide intelligent idle coasting management of the vehicle by providing a disconnect command to disengage the engine 104 from the driveline 107 to provide an idle coasting management (ICM) mode of operation when route conditions are favorable to do so in order to, for example, reduce fuel consumption or management aftertreatment component temperature(s). The driveline disengagement decouples engine 104 from driveline 107 and therefore reduces engine drag and increases vehicle momentum, which postpones the return to high fuel burn conditions. The determination of favorable route conditions can be enhanced with look-ahead route data.

The CEM control unit 150 may include ICM module 152. ICM module 152 is configured with an ICM control scheme that, when enabled, operates in the same general vehicle speed range as traditional lower droops in cruise control speed and can replace cruise control lower droops. When ICM is enabled, the engine brakes behave the same as when ICM is disabled. If cruise control operation with engine brakes is enabled, the engine brakes can be turned on and off at the same vehicle speed with and without ICM enabled. In addition, ICM can be disabled for a calibratable period of time after a cruise control speed bump down.

Inputs received from PCC module 142 are used by CEM control unit 150 and ICM module 152 to enhance ICM. The messages/outputs from PCC module 142 that control predictive cruise control operations are independent of ICM module 152, and ICM module 152 cannot predict the various outputs from PCC module 142. In order to receive the outputs from PCC module 142, CEM control unit 150 and/or ICM module 152 can be connected with PCC module 142 to provide a datalink with a wired, wireless, BLUETOOTH, or satellite connection, for example.

Figure 2:
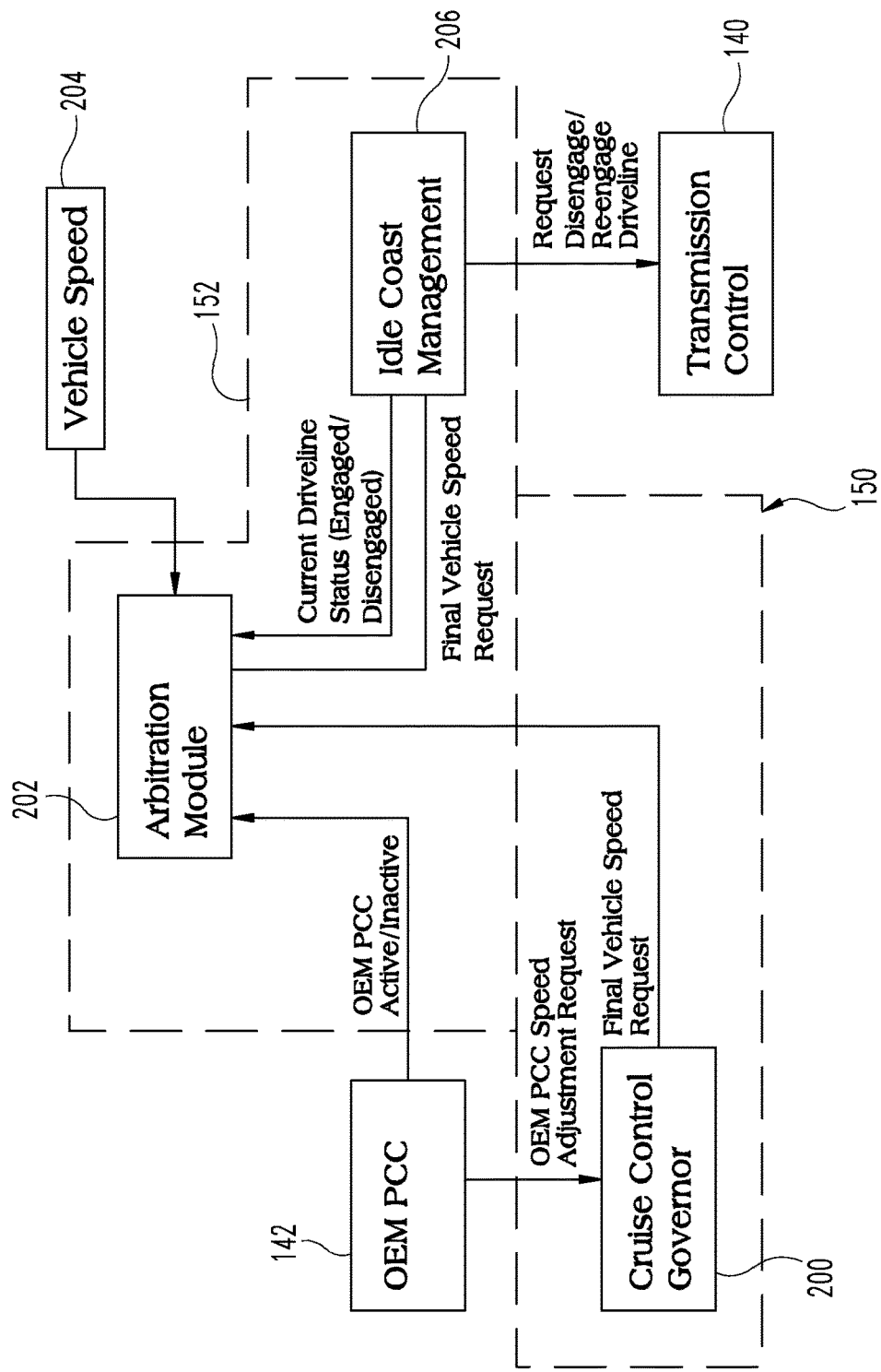
FIG. 2 is a schematic illustration of one embodiment of a controller system for idle coasting management of a vehicle.

Referring to FIG. 2, there is shown a controller arrangement in which PCC module 142 is connected to CEM control unit 150 and/or ICM module 152. PCC module 142 provides a PCC speed adjustment request to cruise control governor module 200 of CEM control unit 150. PCC module 142 also provides a PCC status (for example, active or inactive) to an arbitration module 202 of ICM module 152. Arbitration module 202 also receives a vehicle speed input 204 from a speed sensor (for example), and further receives a final vehicle speed request from cruise control governor module 200 that is based on the OEM PCC speed adjustment request and a cruise control speed from cruise control setting. ICM module 152 further includes an ICM output module 206 provides a current driveline status (engaged/disengaged with engine 102) to arbitration module 202. ICM output module 206 also receives a final vehicle speed request from arbitration module 202. ICM output module 206 provides a request to TCU 140 to disengage or re-engage the driveline 107 to engine 104 based on the data received from arbitration module 202.

Other arrangements that functionally execute the operations of the CEM control unit 150 are contemplated in the present application. For example, additional CEM control unit and cruise control operational aspects with which the present invention may have application may be found with reference to U.S. patent application Ser. No. 14/625,951 filed on Feb. 19, 2015, U.S. patent application Ser. No. 14/261,010 filed on Apr. 24, 2014, and Provisional Application Ser. No. 62/248,728 filed on Oct. 30, 2015, each of which is incorporated herein by reference in its entirety for all purposes.

In one embodiment of operation of ICM module 152 in conjunction with PCC module 142, a terrain profile for the vehicle route is determined. In response to PCC being active under certain operating conditions, arbitration module 202 disables ICM operations even if ICM enablement conditions are otherwise met, and the final speed request varies in accordance with PCC commands from PCC module 142 and/or cruise control governor 200. Such disablement can occur, for example, when the actual speed of the vehicle varies from the PCC final speed request by a threshold amount.

When PCC is inactive, ICM operations can be enabled and ICM module 152 controls idle coasting management operations in response to ICM enablement conditions being present. For example, ICM operation (i.e. driveline is disengaged from engine) can be provided for downhill slope(s) of the terrain when one or more ICM enablement conditions such as engine speed or aftertreatment system/component temperature are met. The driveline is subsequently re-engaged to the engine when ICM enablement conditions are no longer met and/or route conditions indicate engagement of the driveline to the engine is required. ICM mode of operation enablement conditions include any one or more vehicle and route conditions in which idle coasting of the vehicle is suitable or desirable for fuel economy and/or aftertreatment temperature management benefits.

In another embodiment of operation, the PCC status is inactive initially and not controlling the vehicle speed. The cruise control governor module 200 continues to provide final vehicle speed requests to arbitration module 202. In response to the final vehicle speed request, arbitration module 202 can change ICM operation to, for example, re-engage the driveline and the engine in response to the actual vehicle speed deviating from the final vehicle speed request from cruise control governor module 200/PCC module 142 by more than a calibratable threshold amount in order to reduce the speed error. As a result, the ICM mode of operation is altered by the outputs from the PCC module 142 to reduce a duration of ICM operation that would occur in the absence of PCC control.

In another embodiment of operation, the cruise control governor module 200 continues to provide final vehicle speed requests from PCC module 142 to arbitration module 202 while the vehicle is in an ICM mode of operation. In response to the final vehicle speed request from the PCC module 142 being less than an ICM cancel speed in which the engine is normally re-engaged to the driveline to cancel the ICM operating mode, arbitration module 202 changes ICM operation to increase the time in the ICM operating mode as compared to a baseline or nominal ICM mode of operation, allowing further speed reduction toward the final speed request. When the final speed request is achieved in the ICM mode of operation, the engine can be re-engaged to the driveline to operate under control of PCC module 142 and/or cruise control governor 200.

In another embodiment, PCC module 142 provides a future speed request to arbitration module 202. Arbitration module 202 modifies an ICM abort/cancel or extension condition in response to the future speed request. In still other embodiments, ICM module 152 employs predictive road grade or terrain data and a requested vehicle speed adjustment from PCC module 142. A request to decrease vehicle speed from PCC module 142 can result in ICM module 152 providing an ICM (idle coasting) event when other operating conditions would not indicate an ICM event be requested by ICM module 152. A request to increase speed from PCC module 142 can result in ICM module 152 not requesting an ICM event when conditions otherwise indicate that an ICM event be requested.

Figure 3:
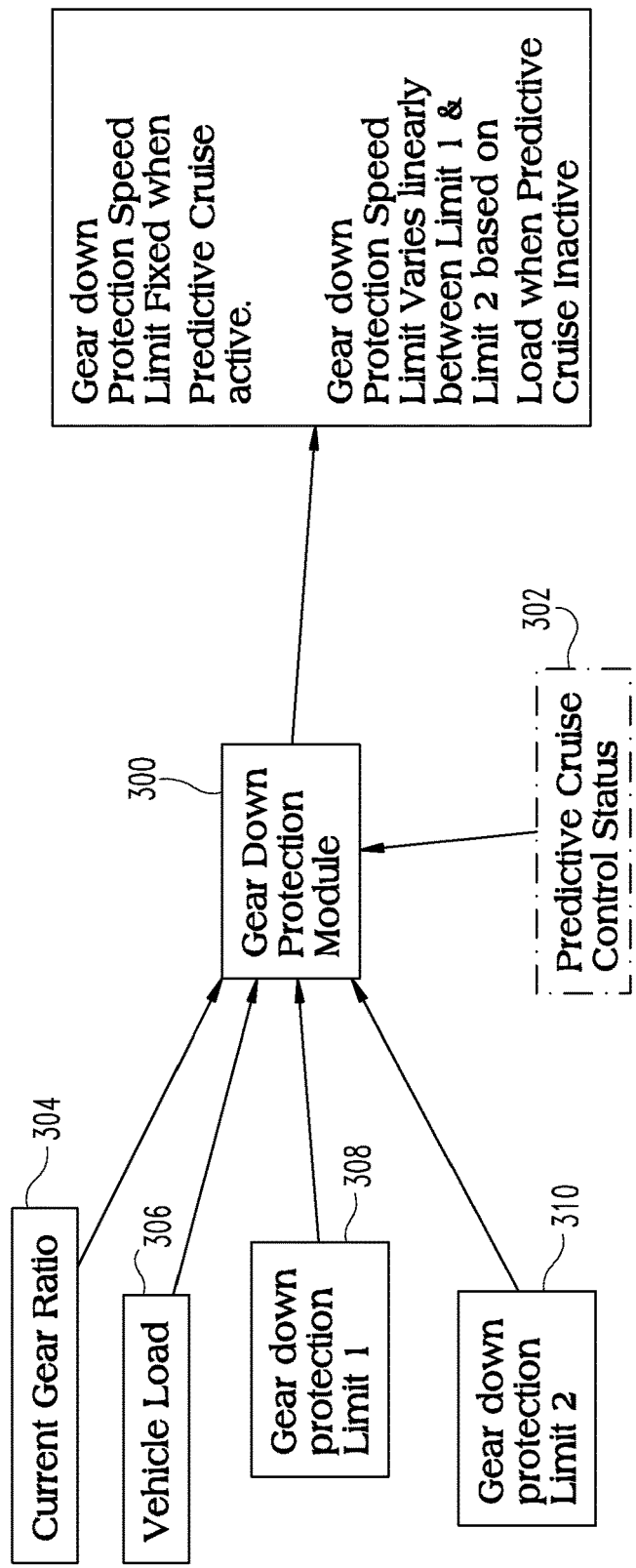
FIG. 3 is a schematic illustration of a variation in gear down protection for a vehicle equipped with a PCC system.

Referring to FIG. 3, there is shown a schematic illustration of a variation in gear down protection for a vehicle equipped with PCC module 142 and ICM module 152. Gear down protection is configured to limit vehicle speed when the transmission 106 is not in top gear and engine 104 is not at full load, encouraging the driver to shift to a higher gear and save fuel. Gear down protection module 300 receives inputs of a PCC status 302, current gear ratio 304, vehicle load 306, a first gear down protection limit 308, and a second gear down protection limit 310. When PCC status 302 is inactive, arbitration module 202 can provide a gear down protection speed limit that varies linearly between the first and second limits based on the engine load. However, when PCC status 302 is active, the gear down protection speed limit is fixed by, for example, arbitration module 202 and/or CEM control unit 150.

Fixing the gear down protection speed limit when PCC status 302 is active prevents a conflict between a request to increase the speed limit by PCC module 142 and a request to decrease the speed limit by gear down protection module 300. This arbitration strategy avoids the potential opposite adjustments in the speed limit while also avoiding the disablement of the gear down protection module 300 or the PCC module 142 when the other is active.

Various aspects of the present disclosure are contemplated. According to one aspect, a method includes: operating a vehicle including an engine that is selectively engageable to a driveline; monitoring, with a predictive cruise control module a speed of the vehicle and a grade of terrain upon which the vehicle is operated; with predictive cruise control of the speed being inactive, operating the vehicle in an idle coasting management mode with the driveline disengaged from the engine in response to at least one idle coasting management enablement condition being present; and with predictive cruise control of the speed being active, disabling the idle coasting management mode of operation of the vehicle.

In one embodiment of the method, with the predictive cruise control of the speed being inactive and in response to idle coasting management enablement conditions not being present, engaging the driveline with the engine and operating the engine with the driveline engaged. In a refinement of this embodiment, in response to a final speed request from the predictive cruise control module being less than a cancellation speed threshold of the idle coasting management mode of operation, continuing to operate the engine with the driveline disengaged from the engine until the speed of the vehicle reduces to the final speed request and then operating the engine with the driveline engaged to the engine. In another refinement, in response to a final speed request from the predictive cruise control module deviating from an actual speed of the vehicle by more than a threshold amount, engaging the driveline to the engine to terminate the idle coasting management mode of operation.

In another embodiment, the method includes linearly varying a gear down protection speed between first and second limits in response to predictive cruise control of the speed being inactive and fixing a limit of the gear down protection speed in response to predictive cruise control of the speed being active.

According to another aspect, a vehicle system includes an engine and a driveline that is selectively engageable to the engine. The system also includes a cycle efficiency management controller connected to the engine, the cycle efficiency management controller including an idle coasting management module operable to selectively disengage the driveline from the engine in response to one or more idle coasting management enablement conditions being present. The system also includes a predictive cruise control module connected to the driveline and in electrical communication with the cycle efficiency management controller over a datalink that provides at least one of a wired or wireless connection to provide outputs from the predictive cruise control module to the cycle efficiency management controller. The outputs from the predictive cruise control module are determined independently of the cycle efficiency management controller, and the outputs from the predictive cruise control module control a speed of the vehicle in response to predictive cruise control being active. The idle coasting management module is disabled to prevent disengagement of the driveline from the engine in response to predictive cruise control being active while the engine and driveline are engaged.

In one embodiment, the predictive cruise control module is included with a transmission control unit as a single module. In yet another embodiment, the cycle efficiency management controller is connected to an engine control unit that is connected to the engine.

In still another embodiment, the idle coasting management module includes an arbitration module that is configured to receive a vehicle speed input, an active/inactive status of predictive cruise control of the vehicle speed, a final vehicle speed request from the cycle efficiency management controller, and an engaged/disengaged status of the driveline from the idle coasting management module.

In one refinement of this embodiment, in response to predictive cruise control being active in the arbitration module, the idle coasting management module is disabled to prevent disengagement of the driveline from the engine. In another refinement, the vehicle speed request is a final vehicle speed request from a cruise control governor module of the cycle efficiency management controller, and the final vehicle speed request is determined from a cruise control speed and a predictive cruise control speed adjustment request. In still another refinement, in response to the final vehicle speed request being less than a cancellation speed threshold associated with an idle coasting management mode of operation, the idle coasting management module is configured to continue to operate the engine with the driveline disengaged from the engine until the speed of the vehicle reduces to the final speed request and then operate the engine with the driveline engaged to the engine. In yet another refinement, in response to the final speed request deviating from an actual speed of the vehicle by more than a threshold amount, the idle coasting management module is configured to engage the driveline to the engine.

In another aspect, an apparatus is provided for controlling operations of a vehicle including an engine and a driveline selectively engageable with the engine and a predictive cruise control module that is operable to control a speed of the vehicle when predictive cruise control of the speed is active. The apparatus includes a cycle efficiency management controller including an intelligent coasting management module operable to selectively disengage the driveline from the engine in response to one or more idle coasting management enablement conditions being present. The apparatus also includes the cycle efficiency management controller being connectable to the predictive cruise control module over a datalink that is at least one of a wired or wireless connection to provide outputs from the predictive cruise control module to the cycle efficiency management controller that are independent of the cycle efficiency management controller and indicative of whether predictive cruise control is active or inactive. The intelligent coasting management module is disabled from disengaging the driveline from the engine in response to predictive cruise control being active with idle coasting management enablement conditions being present.

In one embodiment, the cycle efficiency management controller is connected to an engine control unit. In another embodiment, the idle coasting management module includes an arbitration module that is configured to receive a vehicle speed input, an active/inactive status of predictive cruise control of the vehicle speed, a final vehicle speed request from the cycle efficiency management controller, and an engaged/disengaged status of the driveline from the idle coasting management module.

In a refinement of these embodiments, in response to predictive cruise control being active in the arbitration module, the idle coasting management module is disabled to prevent disengagement of the driveline from the engine. In another refinement, the cycle efficiency management controller includes a cruise control governor module that receives a predictive cruise control speed adjustment request from the predictive cruise control module and provides the final vehicle speed request to the arbitration module. In yet another refinement, the apparatus also includes a gear down protection module that is configured to limit a vehicle speed when a transmission of the vehicle is not in top gear and the engine is not at full load. In a further refinement, the gear down protection module receives an input of the predictive cruise control status and the limit on the vehicle speed is fixed in response to the predictive cruise control status being active.

It should be understood that while the use of words such as preferable, preferably, preferred or more preferred if utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
    operating a vehicle including an engine that is selectively engageable to a driveline;
    monitoring, with a predictive cruise control module, a speed of the vehicle and a grade of terrain upon which the vehicle is operated;
    with predictive cruise control of the speed being inactive, operating the vehicle in an idle coasting management mode with the driveline disengaged from the engine in response to at least one idle coasting management enablement condition being present; and
    with predictive cruise control of the speed being active, disabling the idle coasting management mode of operation of the vehicle.

2. The method of claim 1, wherein with predictive cruise control being inactive and in response to idle coasting management enablement conditions not being present, engaging the driveline with the engine and operating the engine with the driveline engaged.

3. The method of claim 1, further comprising linearly varying a gear down protection speed between first and second limits in response to predictive cruise control of the speed being inactive and fixing a limit of the gear down protection speed in response to predictive cruise control of the speed being active.

4. The method of claim 1, wherein the predictive cruise control module is connected to the driveline and in electrical communication with a cycle efficiency management controller over a datalink that provides at least one of a wired or wireless connection to provide outputs from the predictive cruise control module to the cycle efficiency management controller.

5. The method of claim 4, wherein the outputs from the predictive cruise control module are determined independently of the cycle efficiency management controller.

6. The method of claim 5, wherein the outputs from the predictive cruise control module control a speed of the vehicle in response to predictive cruise control being active.

7. The method of claim 1, wherein the idle coasting management mode of operation is disabled to prevent disengagement of the driveline from the engine in response to predictive cruise control being active while the engine and driveline are engaged.

8. A method for controlling a vehicle including an engine and a driveline selectively engageable with the engine, the engine being operable to provide a speed of the vehicle, the method comprising:
    determining that a predictive cruise control mode of operation is active or inactive;
    in response to the predictive cruise control mode of operation being inactive, selectively disengaging the driveline from the engine to provide idle coasting of the vehicle in response to one or more idle coasting management enablement conditions being present; and
    in response to the predictive cruise control mode of operation being active, preventing disengagement of the driveline from the engine in response to idle coasting management enablement conditions being present.

9. The method of claim 8, wherein with the predictive cruise control mode of operation being inactive and in response to idle coasting management enablement conditions not being present, engaging the driveline with the engine and operating the engine with the driveline engaged.

10. The method of claim 8, further comprising linearly varying a gear down protection speed between first and second limits in response to the predictive cruise control mode of operation being inactive and fixing a limit of the gear down protection speed in response to predictive cruise control mode of operation being active.

* * * * *